United States Patent [19]

Sauerwine et al.

[11] Patent Number: 5,289,972
[45] Date of Patent: Mar. 1, 1994

[54] SINGLE SHEET Z-FOLD MAILER

[75] Inventors: Dean N. Sauerwine, Zionsville; William K. Wetherhold, Jr., Quakertown, both of Pa.

[73] Assignee: Moore Business Forms, Inc., Grand Island, N.Y.

[21] Appl. No.: 940,365

[22] Filed: Sep. 3, 1992

[51] Int. Cl.$^5$ ............................................. B65D 27/06
[52] U.S. Cl. .................................. 229/303; 229/92.1; 229/92.3; 229/305
[58] Field of Search ............... 229/300, 301, 303, 305, 229/92.1, 92.3, 304, 314, 316

[56] References Cited

U.S. PATENT DOCUMENTS

| | | |
|---|---|---|
| 3,126,148 | 3/1964 | Hanson . |
| 3,902,655 | 9/1975 | Huffman . |
| 3,955,750 | 5/1976 | Huffman ........................ 229/314 X |
| 3,977,597 | 8/1976 | Wise et al. . |
| 4,706,878 | 11/1987 | Labotta et al. . |
| 4,715,531 | 12/1987 | Stewart et al. . |
| 4,778,101 | 10/1988 | Paquin . |
| 4,928,875 | 5/1990 | Hutchinson . |
| 5,046,661 | 9/1991 | Kimura . |
| 5,201,464 | 4/1993 | File ................................. 229/304 X |

*Primary Examiner*—Allan N. Shoap
*Assistant Examiner*—Jes F. Pascua
*Attorney, Agent, or Firm*—Nixon & Vanderhye

[57] ABSTRACT

A single sheet intermediate for a mailer type business form is Z-folded into a reusable mailer having a return envelope. The Z-folding of the intermediate provides three panels of about the same size, and a cut out covered by a transparent patch may be provided in the second panel, the patch covered by a removable outgoing addressee label. The reply address may be printed on the first face of the third panel of the mailer, or on the first face of the first panel on a detachable portion that may be inserted into the return envelope. The return envelope is defined by a generally U-shaped adhesive pattern, open at one side, with a flap having rewettable adhesive at the open side. Removable strips along the side edges of the mailer are held together by permanent adhesive, and are removed when opening the mailer and using the return envelope. The bar coding and the outgoing postage indicia are detached from the mailer when it is opened so that they are not visible on the return envelope.

22 Claims, 2 Drawing Sheets

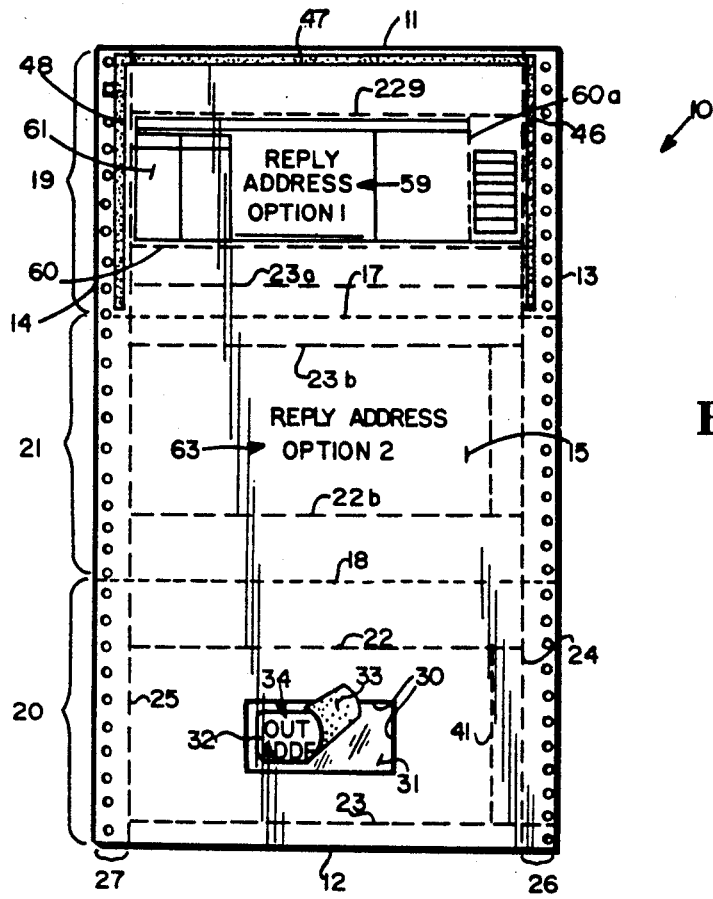
Fig. 1
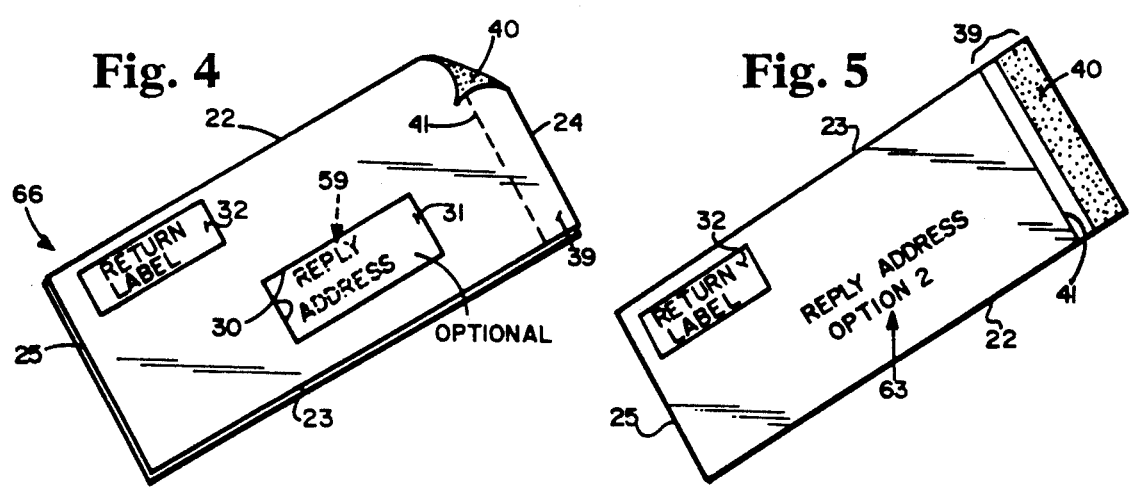
Fig. 4
Fig. 5

SINGLE SHEET Z-FOLD MAILER

BACKGROUND AND SUMMARY OF THE INVENTION

Relatively recent United States postal service regulations have made it imperative that reusable mailer components do not have any of the outgoing address information (including bar coding) or outgoing postage thereon when they are used in the return configuration. According to the present invention, a reusable mailer meeting these requirements is provided that can be constructed in a simple and inexpensive manner from a single sheet of paper. The mailer according to the present invention forms a uniquely constructed return envelope, formed by a generally U-shaped glue pattern opening on the side, and having the outgoing indicia removed from adjacent two edges thereof so that it is entirely clean. Also, it is desirable to provide the outgoing address in the form of a removable (peelable) label which may be applied to the front face of the mailer and then removed, and preferably is disposed so that it at least partially covers a transparent patch covering a cut out in the front panel. A card formed by detachment from another part of the mailer has the reply address printed thereon and may be inserted into the return envelope and be visible through the transparent patch.

According to one aspect of the present invention an intermediate for a mailer type business form is provided. The intermediate comprises the following elements: A sheet of paper having a rectangular configuration with first and second, end, parallel edges; and third and fourth, side, parallel edges; a first dimension, between the end edges being greater than a second dimension, between the side edges; and having a first face and a second face. First and second fold lines parallel to the first and second edges, dividing the sheet into three approximately equal-length panels, including a first panel adjacent the first edge, a second panel adjacent the second edge, and a third panel between the first and second panels. Means defining first and second lines of weakness in each of the first, second, and third panels, the lines of weakness parallel to the first and second edges, and spaced from the first and second edges and the first and second fold lines so that when the sheet is Z-folded about the fold lines the first lines of weakness in all three panels align with each other, and the second lines of weakness in all three panels align with each other. Means providing outgoing addressee indicia on the first face of the second panel. A generally U-shaped adhesive pattern disposed on one or both of the second face of the second panel and the second face of the third panel, between the first and second lines of weakness in each, for forming a return envelope. A return envelope flap defined in one of the second and third panels outside the area encompassed by the U-shaped adhesive pattern, and flap sealing adhesive disposed on the second face of the flap. Means defining third and fourth lines of weakness adjacent and parallel to, but spaced from, the third and fourth edges to define removable side strips. And, permanent adhesive patterns disposed in the removable side strips on the first face on one panel, and on the second face on another panel, for holding the panels together when Z-folded about the fold lines.

The intermediate described above preferably further comprises a cut out and a transparent patch formed in the second panel between the first and second lines of weakness thereof, and the means for providing outgoing addressee indicia on the first face of the second panel comprises a removable label covering at least a part of the transparent patch. Also, the intermediate comprises reply address indicia printed on the first panel between the first and second lines of weakness, and spaced from the lines of weakness of the first panel about the same distance the transparent patch is spaced from the lines of weakness of the second panel. Alternatively, reply address indicia may be printed on the first face of the third panel between the first and second lines of weakness of the third panel.

The area between the second panel second line of weakness and the second edge of the intermediate is large enough to receive outgoing addressee bar code, while the area between the second panel first line of weakness and the second fold line is large enough to receive outgoing postage and return address indicia. These outgoing address elements are removed by detachment of the final form at the lines of weakness.

According to another aspect of the present invention, a reusable mailer type business form is provided comprising the following elements: First and second, end, parallel edges, third and fourth side parallel edges, and first, second, and third panels formed from a Z-folded single sheet of paper, each panel having approximately the same size, and the third panel sandwiched between the first and second panels, each of the first and second panels having an outer face and an inner face, and the third panel having a first face facing the first panel, and a second face facing the second panel. The second panel having means providing outgoing addressee indicia on the outer face thereof. A return envelope generally U-shaped adhesive pattern disposed between the second panel inner face and the third panel second face, and having leg portions parallel to the end edges, and a cross portion parallel to, and adjacent, one of the third and fourth edges. A return envelope flap portion formed by one of the second panel and the third panel. A flap sealing adhesive pattern disposed on the flap portion, on the inner face of the second panel or the second face of the third panel. Lines of weakness disposed parallel to and spaced from, but adjacent, the third and fourth edges, to define removable strips along the third and fourth edges. And, permanent adhesive means disposed on the removable strips for holding the panels together.

A cut out is preferably formed in the second panel with a transparent patch covering the cut out as described above with respect to the intermediate. In this case the reply address indicia may be printed on the inner face of the first panel, and means provided defining a detachable portion of the first panel, containing the reply address indicia, dimensioned so that it is insertable into the return envelope, with the reply address visible through the transparent patch.

It is the primary object of the present invention to provide a simple to construct and utilize reusable mailer, using only a single sheet of paper to form the mailer, the mailer complying U.S.P.S. requirements. This and other objects of the invention will become clear from an inspection of the detailed description of the invention and from the appended claims.

BRIEF DESCRIPTION OF THE DRAWINGS

FIG. 1 is a top plan view of a first face of an intermediate for a mailer type business form according to the present invention;

FIG. 4 is a perspective view of the first face of a return envelope detachable from the mailer of FIG. 3; and FIG. 5 is a perspective view of the second face of an exemplary return envelope detachable from the mailer of FIG. 3.

DETAILED DESCRIPTION OF THE DRAWINGS

Figure 2:
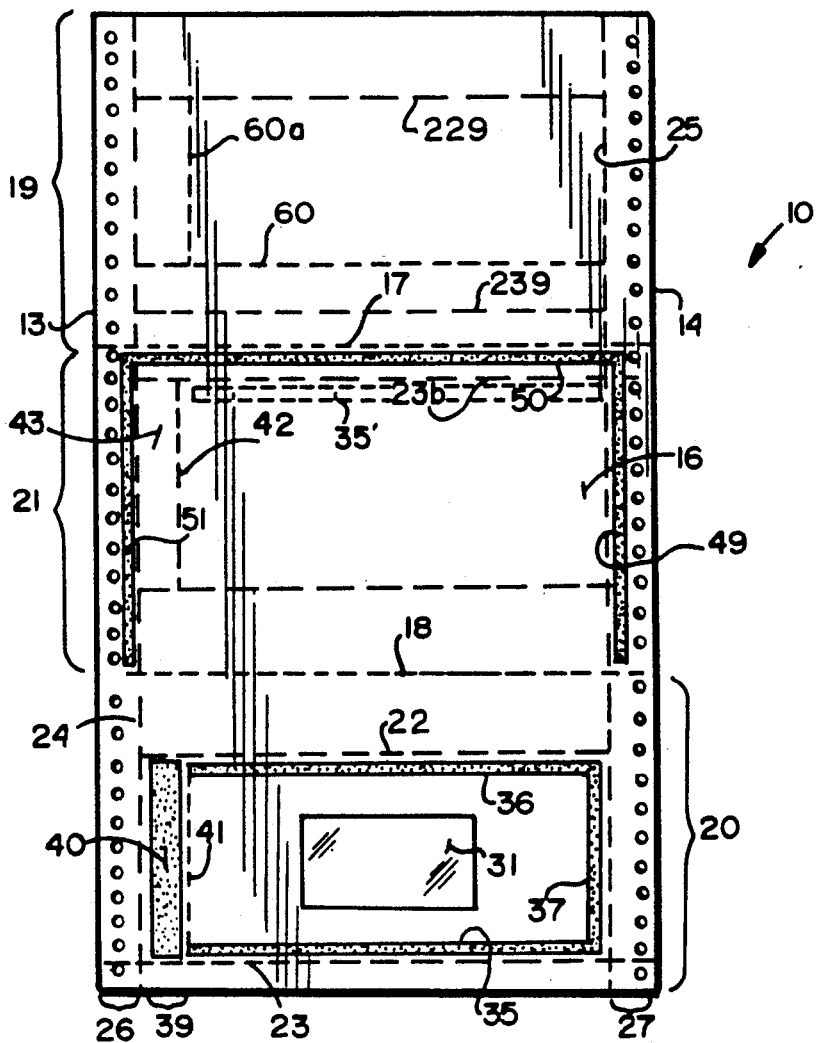
FIG. 2 is a bottom plan view of the sheet of FIG. 1, showing the second face of the intermediate.

An intermediate according to the present invention is shown generally by reference numeral 10 in FIGS. 1 and 2. The intermediate includes a sheet of paper having a rectangular configuration with first and second parallel end edges 11, 12 respectively, and third and fourth parallel side edges 13, 14, respectively. The dimension of the intermediate 10 between the edges 11, 12 is greater than the dimension between the edges 13, 14, as is clear from FIGS. 1 and 2. The sheet of paper forming the intermediate 10 has a first face 15—seen in FIG. 1—and a second face 16—seen in FIG. 2.

First and second fold lines 17, 18 are provided in the intermediate parallel to the first and second edges 11, 12 and dividing the sheet 10 into three approximately equal length panels. The panels comprise a first panel 19 between the first edge 11 and first fold line 17, a second panel 20 between the second fold line 18 and second edge 12, and a third panel 21 intermediate the panels 19, 20, between the two fold lines 17, 18. Preferably the fold lines 17, 18 are lines of weakness, such as perforation lines, but may be score lines.

The intermediate 10 also preferably comprises means defining first and second lines of weakness in each of the first, second and third panels. For example in the second panel the first and second lines of weakness are 22 and 23, respectively, both parallel to the edge 12, with the first line of weakness 22 adjacent but spaced from the second fold line 18, and the second line of weakness 23 adjacent but spaced from the second edge 12. The lines of weakness 22, 23 preferably are perforations. The first panel 19 includes the first line of weakness 22a and second line of weakness 23a, while the third panel 21 has a first line of weakness 22b and a second line of weakness 23b. When the intermediate 10 is Z-folded about the fold lines 17, 18, the three first lines of weakness 22, 22a, 22b are aligned, and the three second lines of weakness 23, 23a, 23b, are aligned.

The intermediate 10 also comprises third and fourth lines of weakness 24, 25 respectively. Lines of weakness 24, 25 are adjacent but spaced from and parallel to the side edges 13, 14, defining removable strips 26, 27 along the side edges 13, 14 of the intermediate 10. The lines of weakness 24, 25 are also preferably perforations.

The mailer 10 also comprises means providing outgoing addressee indicia on the first face 15 of the second panel 20. In the preferred embodiment illustrated in FIG. 1, this is provided by a cut out 30 formed in the panel 20 between the lines of weakness 22, 23, and covered by a conventional transparent patch 31, and a removable label 32 having repositional, or otherwise less than permanently adhering, adhesive 33 on the back surface thereof, and outgoing address indicia 34 on the front surface thereof.

The intermediate 10 further comprises a generally U-shaped adhesive pattern, seen in FIG. 2, defined by the legs 35, 36, and the cross portion 37. The adhesive strips 35–37 may comprise heat sealable adhesive or like permanent adhesive and are applied to the second face 16 of the intermediate 10 to one of both of the second panel 20 and third panel 21 (see, e.g., dotted line adhesive strip 35' in FIG. In the embodiment illustrated in FIG. 2 it is applied only to the second face 16 of the second panel 20, between the lines of weakness 22, 23.

Note that the return envelope is defined by the entire portion between the lines of weakness 22, 23, 24, and 25. Outside of the area defined by the strips of adhesives 35–37 (to the left in FIG. 2) is defined a flap portion 39 for the return envelope, which may be formed on either the second panel 20 (as preferred and as illustrated in FIG. 2) or the third panel 21. In any event a pattern (preferably a strip) of flap sealing adhesive 40 is provided on the second face 16 of the flap portion 39. The adhesive 40 may be any type of adhesive that can be activated by the end user to form a sealed return envelope, such as rewettable adhesive, or pressure sensitive adhesive covered by a release liner strip. Also preferably a fold line 41 (which is a line of weakness, preferably a score line) is formed at the top edges of the adhesive strips 35, 36 adjacent the adhesive strip 40, while in the third panel 21 a perforation line 42 is provided corresponding to, but not in alignment with, the fold line 41, about which the third panel strip 43 may be detached (and then discarded).

In order to hold the mailer together, permanent adhesive patterns are provided in portions that will be detached by the recipient of the mailer formed by the intermediate 10. Such permanent adhesive patterns preferably comprise strips 46, 47, and 48 formed on the first panel 19 first face 15 (see FIG. 1), and strips 49, 50, and 51 formed on the third panel 21 second face 16 (see FIG. 2). The strips 46, 48, 49, and 51 are provided on the removable side strips 26, 27, while the adhesive strips 47, 50 are provided in the detachable portion above the first line of weakness 22a of the first panel 19, and in the detachable portion between the fold line 17 and second line of weakness 23b of the third panel 21. The strips 46 through 48 hold the first panel 19 first face 15 in contact with the third panel 21 first face 15 when the intermediate 10 is Z-folded into a mailer, while adhesive strips 49 through 51 hold the second face 16 of the third panel 21 in contact with the second face 16 of the second panel 20. Other adhesive patterns may be provided, the ones illustrated merely being exemplary.

Figure 3:
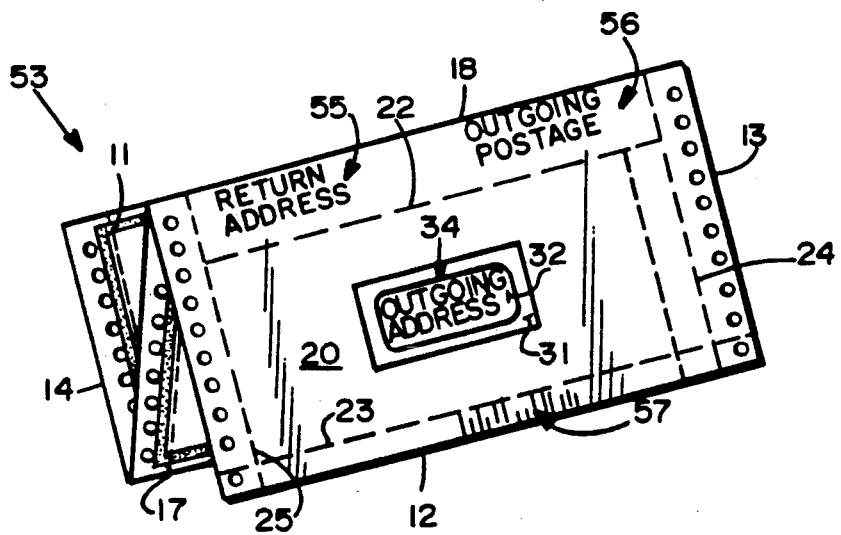
FIG. 3 is a perspective view illustrating Z-folding of the intermediate of FIGS. 1 and 2 to produce a mailer.

FIG. 3 shows the intermediate 10 being Z-folded about fold lines 17, 18 to form a mailer 53. Once the Z-folding has been completed, the mailer 53 is run through a heat sealer or like sealer for activating the adhesive strips 35 through 37 and 46 through 51 to form the completed mailer, and return envelope. The return address indicia 55 is typically printed on while the mailer is in the intermediate 10 form, but the outgoing postage indicia 56 and the bar coding 57 (see FIG. 3), which bar coding 57 is normally applied by the U.S.P.S., are applied after construction of the mailer 53.

Reply address indicia are also preferably provided on the intermediate 10. Two different options may be utilized. According to one option, reply address indicia 59 (see FIG. 1) is printed on the first face 15 of the first panel 19 in the portion thereof between the lines of weakness 22a, 23a and 24, 25. A removable coupon portion defined by the additional lines of weakness 60 and 60a. When the removable coupon—shown generally by reference numeral 61 in FIG. 1—portion is removed the coupon 61 can be inserted into the return envelope and the reply address indicia 59 will be visible through the transparent patch 31, the positioning of the reply address indicia 59 on the coupon 61, and the dimensions of the coupon 61 with respect to the return envelope, making that feasible. Alternatively, the reply address indicia may be printed on the front face 15 of the third panel 21, as indicated by reference numeral 63 in FIG. 1, the front face 15 of the third panel 21 then serving as the "front" face of the return envelope.

When the outgoing addressee receives the mailer 53, he/she opens it up by detaching along the perforations 24, 25 as well as the perforations 22, 23. Note that the area between the lines 18, 22, 24, and 25 (see FIG. 3) in the second panel 20 is large enough to contain both the outgoing postage indicia 56 and the return address indicia 55 so that when detachment occurs along the line 22 the outgoing information is no longer present. Similarly, the area between the edge 12 and the lines 23 through 25 is great enough to receive the bar code 57 so that when detachment along line 23 takes place the outgoing bar code is also removed.

FIG. 4 shows the front face of one form of return envelope according to the present invention, being shown generally by reference numeral 66. In this embodiment, the outgoing address label 32 has been removed from the transparent patch 31 and has been placed in a "return address" portion (upper left hand corner) of the return envelope 66, thus providing the return address information. The coupon 61 which has been detached from the rest of the sheet 10 is then inserted through the open end of the return envelope 66 (that is the end along the fold line 41 not sealed by the adhesive strips 35 through 37), so that the reply address 59 is visible through the transparent patch 31, as seen in FIG. 4. Then the flap 43 is detached along perforation 42 and the flap 39 is folded about the fold line 41, and the rewettable adhesive 40 activated, the adhesive 40 then holding the flap 39 covering the "open" end of the envelope 66.

FIG. 5 illustrates the alternative configuration of the return envelope in which the "front" of the return envelope is defined by the first face 15 of the third panel 21. In this configuration (in which the transparent patch 31 is not necessary) shown generally by reference numeral 66a in FIG. 5, the inserts for the return envelope 66a need not be properly positioned within it, although the removable label 32 may still be used as the return address label (or it may be discarded). After an insert has been provided in the envelope 66a, again the flap 43 is detached along perforation 42 and the flap 39 is folded about the fold line 41 and the rewettable adhesive 40 is activated, to seal the flap 39 covering the open end of the envelope 66a.

It will be seen from both FIGS. 4 and 5 that the return envelope 66, 66a is "clean" having no outgoing postage, outgoing return address, or outgoing bar code indicia thereon. Also the mailer 53 according to the invention is constructed in a simple manner by merely Z-folding a single sheet 10 after printing and glue application, and then passing it through a sealer.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent products and intermediates.

What is claimed is:

1. An intermediate for a mailer type business form, comprising:
   a sheet of paper having a rectangular configuration with first and second, end, parallel edges; and third and fourth, side, parallel edges; a first dimension, between the end edges being greater than a second dimension, between the side edges; and having a first face and a second face;
   first and second fold lines parallel to said first and second edges, dividing said sheet into three approximately equal-length panels, including a first panel adjacent said first edge, a second panel adjacent said second edge, and a third panel between said first and second panels;
   means defining first and second lines of weakness in each of said first, second, and third panels, the lines of weakness parallel to said first and second edges, and spaced from said first and second edges and said first and second fold lines so that when said sheet is Z-folded about said fold lines the first lines of weakness in all three panels align with each other, and the second lines of weakness in all three panels align with each other;
   means providing outgoing addressee indicia on said first face of the second panel;
   a generally U-shaped adhesive pattern disposed on at least one of said second face of said second panel and said second face of said third panel, between said first and second lines of weakness in each, for forming a return envelope;
   a return envelope flap, having first and second faces, defined in one of said second and third panels outside the area encompassed by said U-shaped adhesive pattern, and flap sealing adhesive disposed on said second face of said flap;
   means defining third and fourth lines of weakness adjacent and parallel to, but spaced from, said third and fourth edges to define removable side strips; and
   permanent adhesive patterns disposed in said removable side strips on said first face on one panel, and on said second face on another panel, for holding said panels together when Z-folded about said fold lines.

2. An intermediate as recited in claim 1 further comprising a cutout and a transparent patch formed in said second panel between said first and second lines of weakness thereof, and wherein said means providing outgoing addressee indicia on said first face of said second panel comprises a removable label covering at least a part of said transparent patch.

3. An intermediate as recited in claim 2 further comprising reply address indicia printed on said first panel between said first and second lines of weakness thereof, and spaced from the lines of weakness of said first panel about the same distance said transparent patch is spaced from the lines of weakness of said second panel.

4. An intermediate as recited in claim 3 wherein said reply address indicia is printed on the first face of said first panel.

5. An intermediate as recited in claim 1 further comprising reply address indicia printed on the first face of said third panel between said first and second lines of weakness of said third panel.

6. An intermediate as recited in claim 5 wherein said means providing outgoing addressee indicia on said first face of said second panel comprises a removable label disposed on said first face of said second panel.

7. An intermediate as recited in claim 1 wherein the second panel second line of weakness is closer to said second edge than is said second panel first line of weakness; and wherein the area between said second panel second line of weakness and said second edge is large enough to receive outgoing addressee bar code thereon.

8. An intermediate as recited in claim 7 wherein the second panel first line of weakness is closer to said second fold line than is said second panel second line of weakness; and wherein the area between said second panel first line of weakness and said second fold line is large enough to receive outgoing postage and return address indicia.

9. An intermediate as recited in claim 1 wherein the second panel first line of weakness is closer to said second fold line than is said second panel second line of weakness; and wherein the area between said second panel first line of weakness and said second fold line is large enough to receive outgoing postage and return address indicia.

10. An intermediate as recited in claim 1 wherein said first and second fold lines are lines of weakness.

11. An intermediate as recited in claim 1 wherein said flap sealing adhesive is rewettable adhesive.

12. An intermediate for a mailer type business form, comprising:
   a sheet of paper having a rectangular configuration with first and second, end, parallel edges; and third and fourth, side, parallel edges; a first dimension, between the end edges being greater than a second dimension, between the side edges; and having a first face and a second face;
   first and second fold lines parallel to said first and second edges, dividing said sheet into three approximately equal-length panels, including a first panel adjacent said first edge, a second panel adjacent said second edge, and a third panel between said first and second panels;
   a cutout and a transparent patch formed in said second panel;
   means providing outgoing addressee indicia on said first face of said second panel, comprising a removable label covering said transparent patch;
   a return envelope adhesive pattern disposed on at least one of said second face of said second panel and said second face of said third panel for forming a return envelope;
   a return envelope flap defined in one of said second and third panels outside the area encompassed by said return envelope adhesive pattern, and flap sealing adhesive disposed on said second face of said flap;
   means defining lines of weakness adjacent parallel to, but spaced from, said third and fourth edges to define removable side strips; and
   permanent adhesive patterns disposed on said removable side strips on said first face on one panel, and on said second face on another panel, for holding said panels together when Z-folded about said fold lines.

13. An intermediate as recited in claim 12 further comprising reply address indicia printed on said first panel; and means for facilitating detachment of the portion of said first panel having said reply address indicia thereon for insertion into the return envelope defined by said second and third panels.

14. A reusable mailer type business form comprising:
   first and second, end, parallel edges; third and fourth side parallel edges; and first, third panels formed from a Z-folded single sheet of paper, each panel having approximately the same size, and said third panel sandwiched between said first and second panels; each of said first and second panels having an outer face and an inner face, and said third panel having a first face facing said first panel, and a second face facing said second panel;
   said second panel having means providing outgoing addressee indicia on said outer face thereof;
   a return envelope generally U-shaped adhesive pattern disposed between said second panel inner face and said third panel second face, and having leg portions parallel to said end edges, and a cross portion parallel to, and adjacent, one of said third and fourth edges;
   a return envelope flap portion formed by one of said second panel and said third panel;
   a flap sealing adhesive pattern disposed on said flap portion;
   lines of weakness disposed parallel to and spaced from, but adjacent, said third and fourth edges, to define removable strips along said third and fourth edges; and
   permanent adhesive means disposed on said removable strips for holding said panels together.

15. A mailer as recited in claim 14 further comprising a cutout in said second panel, and a transparent patch covering said cutout; and wherein said means providing outgoing addressee indicia on said second panel outer face comprises a removable label at least in part covering said transparent patch.

16. A mailer as recited in claim 15 further comprising reply address indicia printed on said inner face of said first panel; and means defining a detachable portion of said first panel, containing said reply address indicia, dimensioned so that it is insertable in said return envelope, with said reply address visible through said transparent patch.

17. A mailer as recited in claim 14 further comprising reply address indicia printed on said third panel first face.

18. A mailer as recited in claim 14 further comprising first aligned lines of weakness formed in each of said panels, parallel to said first and second edges, said first line of weakness of said second panel spaced from said first edge a distance sufficient to define an area large enough to receive outgoing postage and return address indicia on said second panel outer face.

19. A mailer as recited in claim 18 further comprising second aligned lines of weakness formed in each of said panels, parallel to said first and second edges, said second line of weakness of said second panel spaced from said second edge a distance sufficient to define an area large enough to receive outgoing addressee bar code on said second panel outer face.

20. A reusable mailer type business form comprising:
   first and second, end, parallel edges; third and fourth side parallel edges; and first, second, and third panels formed from a Z-folded single sheet of paper, each panel having approximately the same size, and said third panel sandwiched between said first and second panels; each of said first and second panels having an outer face and an inner face, and said third panel having a first face facing said first panel, and a second face facing said second panel;

a cutout in said second panel, and a transparent patch covering said cutout;

said second panel having means providing outgoing addressee indicia on said outer face thereof, comprising a removable label covering at least a portion of said transparent patch;

a return envelope forming adhesive pattern disposed between said second panel inner face and said third panel second face;

a return envelope flap portion formed by one of said second panel and said third panel;

a flap sealing adhesive pattern disposed on said flap portion, on said inner face of said second panel or said second face of said third panel;

lines of weakness disposed parallel to and spaced from, but adjacent, said third and fourth edges, to define removable strips along said third and fourth edges; and permanent adhesive means disposed on said removable strips for holding said panels together.

21. A mailer as recited in claim 20 further comprising reply address indicia printed on said inner face of said first panel; and means defining a detachable portion of said first panel, containing said reply address indicia, dimensioned so that it is insertable in said return envelope, with said reply address visible through said transparent patch.

22. A mailer as recited in claim 20 wherein said flap sealing adhesive is rewettable adhesive.

* * * * *